United States Patent Office 2,908,664
Patented Oct. 13, 1959

2,908,664

MODIFIED EPOXIDE RESINS

William J. Belanger, John E. Masters, and Darrell D. Hicks, Louisville, Ky., assignors to Devoe & Raynolds Company, Inc., a corporation of New York No Drawing. Application June 11, 1956
Serial No. 590,416

9 Claims. (Cl. 260—42)

This invention relates to novel resinous compositions. In one of its aspects the invention relates to resin compositions which are derived from epoxide compounds, or polyepoxides. In another of its aspects the invention pertains to methods for the preparation of these novel resins.

A great deal of research has been directed toward the production of epoxide resins because these substances have been found to be valuable compositions for use in the manufacture of varnishes, molding resins, adhesives, films and the like.

It is known that epoxide resins, obtained as a product of reaction of a polyhydric compound, such as a dihydric phenol, and an epihalohydrin can be converted to thermosetting resins by the use of polycarboxylic acid anhydrides. It is known, for example, that hard thermosetting resins are obtained by condensing certain expoxide resins with phthalic acid anhydride. This invention has as an object the provision of modified polybasic acid anhydride cured epoxide resins. The invention also relates to the production of fusible, soluble resins resulting from the modification of the polybasic anhydride-epoxide reaction mixture, the modified reaction mixture being capable on heating of forming an insoluble, infusible cured resin.

Theoretically, two epoxide groups (one mol of a diepoxide) should be cured with two anhydride groups in order to obtain a maximum degree of cross-linking. However, this maximum degree of cross-linking yields a resin, the utility of which is limited by its brittleness. On the other hand, a ratio of less than two anhydride groups for two epoxide groups does not result in the greatest degree of cure. Nevertheless, it has been found that the best anhydride-epoxide cures are obtained when one anhydride group is used with two epoxide groups. This invention is based on the discovery that, using a glycidyl polyether having more than one epoxide group per molecule and having a weight per epoxide below 1000, when the reaction mixture is modified by the addition of a third ingredient, not only a high degree of cure is obtained but a resin results which does not have the high degree of brittleness. It has been found that when less than two anhydride groups per mol of diepoxide are employed the cured resin contains unreacted epoxide groups which have not entered into the curing reaction. It has also been found that by the use of a modifying ingredient or agent advantage can be taken of these unreacted epoxide groups. When the reaction mixture is modified by the addition of a third ingredient a high degree of cure is obtained through the use of previously unreacted epoxide groups, and a resin results which does not have the high degree of brittleness. In accordance with this invention resins can be made which are well cured and hard but which are sufficiently flexible to adapt themselves to a wide variety of applications, particularly in the adhesive and potting fields. Moreover, there is a definite economic advantage to preparing resins according to this invention. Since the modifiers of the invention replace part of the more expensive epoxide, the cured resin can be produced much more cheaply than the same quantity of unmodified cured resin.

In accordance with an embodiment of this invention the modified resins contemplated are prepared by the use as a modifying agent of an aromatic compound having a phenolic hydroxyl group as its sole functional group, in other words a monohydric phenol. Desirable modifiers are simple phenols such as phenol, the cresols, xylenols and higher molecular weight alkyl phenols.

It is preferred to use a phenol having the graphic formula

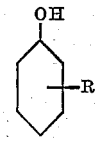

where R is a member of the group consisting of hydrogen, alkyl radicals (e.g., methyl, ethyl, propyl, butyl, etc.), aryl radicals (e.g., phenyl, cresyl, etc.) and alkoxy radicals (e.g., methoxy, ethoxy, etc.). Included are p-tertiary-butyl-m-cresol, p-hexyl phenol, p-heptyl phenol, p-n-amyl phenol, p-secondary-butyl-m-cresol, p-n-butyl phenol, p-neopentyl phenol, p-phenyl phenol, p-isoamyl phenol, p-(1,1,3,3-tetramethylbutyl)phenol, p-isopropyl phenol, o-amyl phenol, o-butyl phenol, o-(2-heptyl)-phenol, and o-phenyl phenol. Examples of other suitable phenols are p-t-butyl phenol, p-hydroxydiphenyl, o-cyclohexyl phenol, p-cyclohexyl phenol, p-t-octyl phenol (p-diisobutyl phenol), o-t-amyl phenol, p-t-amyl phenol, p-t-hexyl phenol, 2,4-di-t-amyl phenol, m-methoxy phenol, guaiacol, etc.

Particularly preferred monohydric phenols are mono-, di-, tri-, etc. alkyl phenols having a total of not more than 24 alkyl carbon atoms, e.g., t-butyl phenol, 2-ethyl, 4-octyl phenol, 2-decylphenol, 4-iso-octyl phenol, 2-butyl, 4-amyl, 6-hexyl phenol, tert-amyl phenol, tetramethyl, butyl phenol and the like. Mixtures of the various phenols are also contemplated.

Thus in one of its aspects the invention provides for the preparation of cured resins by the reaction of a polybasic acid anhydride, a glycidyl polyether containing more than one epoxide group per molecule and having a weight per epoxide below 1000, and a monohydric phenol. Normally when these three ingredients are reacted an elevated temperature is employed, for example, a temperature sufficient to dissolve the polybasic acid anhydride in the glycidyl polyether. It is preferred in most instances to employ a basic catalyst, such as an alkali metal or alkaline earth metal hydroxide or an organic amine. The invention is, of course, not limited to the use of a catalyst, but if a catalyst is not employed a higher curing temperature will be required.

In carrying out the reaction, the mixture of a polybasic acid anhydride, a monohydric phenol and a glycidyl polyether are heated together until a clear melt is obtained. The basic catalyst is then added, in an amount of from 0.01 to 5 percent by weight based on the composition, and the mixture is cured, producing resins having a wide range of usefulness, for example in the plotting and casting fields and in the field of adhesives. It is understood that while the general procedure is to combine the three reactants, the monohydric phenol can be partially or wholly reacted with epoxide prior to addition of remaining epoxide and anhydride. For instance, the monohydric phenol can be added partially as the reaction product of phenol plus epoxide and partially as monohydric phenol per se. The resin compositions prepared in accordance with an aspect of this invention therefore include curable mixtures of glycidyl polyethers, polybasic acid anhydrides and monohydric phenols.

A particular advantage of this invention is that high molecular weight epoxides can be used to prepare resins having improved properties. For example, when high molecular weight glycidyl polyethers are employed, more flexible resins are obtained in accordance with this invention than when those resins are cured without modifiers. In effect, in one of its embodiments the invention includes an in situ process for synthesizing a high molecular weight epoxide resin from a low molecular weight epoxide using only a monohydric phenol and curing the higher molecular weight resin with a polybasic acid anhydride.

The use of a monhydric phenol in the modification of anhydride-epoxide compositions is considered unlike the use of an alcohol. Acid anhydride, if pure, will not react with an epoxy group but preferentially will react with an alcoholic hydroxyl group. When a phenol, rather than an alcohol, is used in combination with the mixture of polybasic acid anhydride and glycidyl polyether, a reaction takes place between epoxide groups and phenolic hydroxyl groups bringing about a different type of cross-linking. The reaction between phenolic hydroxyl groups and epoxide groups results in the formation of alcoholic hydroxyls, which in turn are reactive with polybasic acid anhydrides. This reaction of polybasic acid anhydride and alcoholic hydroxyls results in the formation of free carboxyl radicals which will react with additional epoxide groups, the entire mechanism resulting in the formation of crosslinked compounds. These cross-linked compounds are well cured resins when reactants are combined in ratios in accordance with this invention.

It was noted that when two mols of anhydride are caused to react with one mol of an epoxide a resin results having a limited use because of its brittleness. In the case of glycidyl polyethers, it is perhaps better to use epoxide equivalents. The epoxide equivalent represents the weight of the product per epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for 20 minutes and back titrating the excess of pyridine hydrochloride with 0.1 N sodium hydroxide using phenolphthalein as indicator and considering one HCl as equivalent to one epoxide group. Throughout this description the molecular weight of the glycidyl polyether is assumed to be two times the weight per epoxide. Molecular weight determinations can, however, be made by a standard boiling point elevation method. In some cases, the molecular weight values correspond to the theoretical values for a straight chain polymer. In other cases, however, a higher molecular weight value is obtained, seemingly indicating a more complex structure.

The quantities of the glycidyl polyether, the acid anhydride and the monohydric phenol employed in the practice of this invention are best expressed in ratios of glycidyl polyether to monohydric phenol to anhydride and in mols of monohydric phenol to anhydride equivalents of polybasic acid anhydride to epoxide equivalents of glycidyl polyether. An anhydride equivalent represents the weight of the acid anhydride, generally in grams, per anhydride group. Thus, by two anhydride equivalents is intended two times the weight per anhydride. In carrying out this invention it has been found that the three reactants desirably can be used in a ratio of 0.1 to 0.8 mol of monohydric phenol to two epoxide equivalents of glycidyl polyether to 1.9 to 1.2 equivalents of polybasic acid anhydride. Resins can, of course, be prepared using slightly more than these quantites. For example, in the case of some phenols one or more mols of the monohydric phenol can be used; but in general the amount used will have been in excess, resulting in less desirable resinous compositions. Accordingly, desirably the ratio of mols of anhydride plus mols of phenol per mol of diepoxide is two to one.

As indicated, this invention is applicable to glycidyl polyethers containing more than one epoxide group per molecule and having a weight per epoxide below 1000. Desirable glycidyl polyethers are glycidly polyethers of polyhydric phenols or polyhydric alcohols. Such glycidyl polyethers are generally produced by the reaction of epichlorhydrin or glycerol dichlorhydrin with dihydric phenols, polyhydric alcohols or polyhydric phenols generally in the presence of a condensing agent, for example, caustic alkali.

The products resulting from the reaction of a polyhydric alcohol or a polyhydric phenol with epichlorhydrin or glycerol dichlorhydrin are monomeric and straight chain polymeric products characterized by the presence of at least one terminal epoxide group. Monomeric polyglycidyl polyethers include the glycidyl polyethers of polyhydric phenols obtained by reacting in an alkaline medium a polyhydric phenol with an excess, e.g., 4 to 8 mol excess, of an epihalohydrin. Thus a polyether which is substantially 2,2-bias(2,3-epoxypropoxyphenyl)propane is obtained by reacting bisphenol [2,2-bis(4-hydroxyphenyl)propane] with an excess of epichlorhydrin. Other polyhydric phenols that can be used for this purpose include resorcinol, catechol, hydroquinone, methyl resorcinol, or polynuclear phenols such as 2,2-bis (4-hydroxyphenyl)butane, 4,4'-dihydroxybenzophenone, bis(4-hydroxyphenyl) ethane and 1,5-dihydroxynaphthalene. The epihalohydrins can be further exemplified by 3-chloro-1,2-epoxybutane, 3-bromo-1,2-epoxyhexane, 3-chloro-1,2-epoxyoctane and the like.

One class of straight chain polymeric glycidyl polyethers is produced by the reaction of a polyhydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary from about one mol of bisphenol to 1.2 mols epichlorhydrin or glycerol dichlorhydrin to about one mol bisphenol to 1.5 mols epichlorhydrin or glycerol dichlorhydrin as set forth in U.S. Patent 2,615,007. In addition, sufficient caustic alkali is employed to combine with the chlorine atoms of the epichlorhydrin or glycerol dichlorhydrin.

Another group of polymeric glycidyl polyethers is produced by the reaction of a dihydric phenol such as bisphenol with epichlorhydrin in the proportions of about two mols of epichlorhydrin to about one mol of bisphenol and with the use of caustic alkali in amounts sufficient to combine with the chlorine of the epichlorhydrin. Such glycidyl polyethers are described in U.S. Patent 2,582,985.

Also included are polyepoxypolyhydroxy polyethers obtained by reacting epichlorhydrin or glycerol dichlorhydrin with a mononuclear polyhydric phenol such as resorcinol, hydroquinone, catechol, phloroglucinol, etc., or a polynuclear phenol, such as bisphenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers.

Still another group of polymeric glycidyl polyethers which can be used in accordance with this invention results from the reaction, generally in alkaline or acid medium, of a polyhydric phenol or polyhydric alcohol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis(2,3-epoxy-2-methylpropyl)ether, the reaction product of resorcinol and bis(2,3-epoxypropyl)-ether, a similar reaction product using catechol, etc. The process for preparing polyepoxypolyhydroxy polyethers of this group is disclosed in U.S. Patent 2,615,008.

Polyhydric alcohols can be used in the preparation of glycidyl polyethers as well as polyhydric phenols. As set forth in U.S. Patent 2,581,464 these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol and the like and subsequently treating the resulting product with an alkaline compound.

The polybasic acid anhydrides useful in preparing the resin compositions of this invention contain one or more anhydride groups. Polybasic acid anhydrides applicable to this invention include both aliphatic and aromatic dicarboxylic acid anhydrides, either saturated or unsaturated, for example, succinic, adipic, maleic, tricarballyic, phthalic, pyromellitic anhydrides. Endo-cis-bicyclo-(2,2,1)-5-heptene-2,3-dicarboxylic anhydride (sold under the trademark "Nadic" anhydride) and 1,4,5,6,7,7-hexachloro - bicyclo - (2,2,1) - 5 - heptene - 2,3 - dicarboxylic anhydride (sold under the trademark "Chlorendic" anhydride) are also desirable. Preferred polybasic acid anhydrides are the anhydrides of dicarboxylic acid, preferably phthalic acid anhydride. The acid anhydrides, which are produced by diene syntheses can also be used, for instance, the acid anhydrides which are derived from eleostearic acid-glyceride and maleic acid anhydride, also those of maleic acid anhydride plus terpinene or limonene or other unsaturated hydrocarbons of the terpene series. Other polybasic acid anhydrides within the contemplation of this invention are glutaric, sebacic, isosuccinic, tetrahydrophthalic, naphthalene-dicarboxylic anhydrides, etc. Mixtures of anhydrides can, of course, also be used.

It has been pointed out that while the invention is not limited to the use of a catalyst improved cures are often obtained thereby. Generally speaking, any of the known catalysts which are activators for expoxide-carboxyl reactions can be used to increase the rate of cure of the compositions, for example, organic bases, tertiary amines and quaternary ammonium hydroxides. Basic catalysts are generally used for this purpose, for example, alkali metal or alkaline earth metal hydroxides and organic bases, such as sodium hydroxide, calcium hydroxide, dimethylaminomethyl phenol, triethylamine, methyl di-isopropylamine, di-n-propylamine and benzyl trimethyl ammonium hydroxide. These basic catalysts are employed in catalytic quantities, say, from 0.10 to 5 percent by weight based on the composition.

Methods of preparing the modified epoxide resins of this invention will be readily apparent from the following examples. The examples are intended to be illustrative only, since in the light of these examples, variations and modifications will become obvious. In the examples, the glycidyl polyethers are expressed in mols. For the purpose of the examples, one mol was assumed to be two times the weight per epoxide.

EXAMPLE 1

Part A

About 276 parts (3 mols) of glycerol were mixed with 822 parts (9 mols) of epichlorhydrin. To this reaction mixture were added 10 parts of diethyl ether solution containing about 4.5 percent boron trifluoride, according to U.S. Patent 2,581,464. The temperature of this mixture was between 50° C. and 75° C. for about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The resulting polyglycidyl ether was a pale yellow, viscous liquid containing between 2 and 3 epoxide groups per molecule. It had a weight per epoxide of 155.

Part B 12.15 grams of the glycidyl polyether of Part A of this example, 10.02 grams of phthalic acid anhydride and 2.83 grams of dodecyl phenol were combined and heated with stirring until a clear melt was obtained, the ratio being 2 epoxy equivalents glycidyl polyether to 1.725 mols phthalic acid anhydride to 0.275 mol monohydric phenol. To this homogeneous melt 0.5 percent, based on the total combined weights of the reactants, of dimethylaminomethyl phenol was added as a catalyst. A portion of about 25 grams of the catalyzed melt was poured into an aluminum cup. In a closed container whereby no anhydride would be lost through volatilization, the 25 gram portion of the melt was heated at a temperature of 180° C. for about one hour. A tough, flexible, well cured resin was obtained.

EXAMPLE 2

As in above Example 1, 12.73 grams of the glycidyl polyether of Part A of Example 1, 5.53 grams of maleic acid anhydride and 6.74 grams of diamyl phenol were combined and heated with stirring until a homogeneous mixture was obtained, the ratio being 2 epoxy equivalents glycidyl polyether to 1.375 mols maleic acid anhydride to 0.625 mol monohydric phenol. When the system was homogeneous, 0.5 percent benzyldimethylamine was added as a catalyst, based on the total combined weights of the reactants. In order to cure the resinous melt, about 25 grams of the homogeneous mixture were transferred to a shallow aluminum cup. The cup was heated at a temperature of 125° C. for three hours and 180° C. for one hour in a closed container. A soft, flexible, well cured resin was obtained.

EXAMPLE 3

Part A

In a flask equipped with a stirrer, condenser and thermometer were placed 330 grams (3 mols) of resorcinol, and 2775 grams (30 mols) of epichlorhydrin in 27 grams of water. To this mixture 250 grams of sodium hydroxide flakes were added slowly in two additions. First 165 grams were added and the flask was slowly heated. When the temperature reached 105° C. heat was withdrawn and the mixture was cooled in a water bath. When the temperature of the mixture decreased to 100° C., an additional 85 grams of sodium hydroxide were added, the mixture being continuously cooled because of the exothermic reaction. After the exotherm subsided, the material was distilled to remove the water. The flask was then cooled, 1000 cc. of benzene added and the product filtered to remove the sodium chloride. The excess epichlorhydrin and other volatile matter were removed under vacuum. A pale amber, viscous liquid having a weight per epoxide of 143 was obtained.

Part B 11.56 grams of the glycidyl polyether of Part A of this example, 8.23 grams of phthalic acid anhydride and 5.21 grams of octyl phenol were combined and heated with stirring until a clear melt was obtained, the mol ratio being one mol glycidyl polyether to 1.375 mols phthalic acid anhydride to 0.625 mol monohydric phenol. To this homogeneous melt 0.5 percent, based on the total combined weights of the reactants, of dimethylaminomethyl phenol was added as a catalyst. A portion of about 25 grams of the catalyzed melt was poured into an aluminum cup. In a closed container whereby no anhydride would be lost through volatilization, the 25 gram portion of the melt was heated at a temperature of 180° C. for about one hour. A very tough, flexible, infusible resin was obtained.

EXAMPLE 4

Part A

Following the procedure set forth in Part A of Example 3 a glycidyl polyether was prepared using p,p'-dihydroxydiphenyl instead of resorcinol, the molar proportions as well as the procedure being the same as in Example 3. The resulting glycidyl polyether was a white crystalline solid having a weight per epoxide of 153.

Part B 8.35 grams of the glycidyl polyether of Part A of this example, 12.15 grams of "Chlorendic" acid anhydride and 4.50 grams of octyl phenol were combined and heated with stirring until a clear melt was obtained, the mol ratio being one mol glycidyl polyether to 1.2 mols "Chlorendic" acid anhydride to 0.8 mol monohydric phenol. To this homogeneous melt 0.5 percent, based on the total combined weights of the reactants, of dimethylaminomethyl phenol was added as a catalyst. A portion of about 25 grams of the catalyzed melt was poured into an aluminum cup. In a closed container whereby no anhydride would be lost through volatilization, the 25 gram portion of the melt was heated at a temperature of 180° C. for about one hour. A flexible, infusible resin was obtained.

EXAMPLE 5

Part A

In a reaction vessel fitted with a stirrer, 4 mols of bis(4-hydroxyphenyl)-2,2-propane (bisphenol) and 5 mols of epichlorhydrin were added to 6.43 mols of sodium hydroxide as a 10 percent aqueous solution. While being stirred, the reaction mixture was gradually heated to about 100° C., during 80 minutes time and was maintained at 100–104° C. for an additional 60 minutes under reflux. The aqueous layer was decanted and the resin washed with boiling water until neutral to litmus whereupon the resin was drained and dehydrated by heating to about 150° C. The resulting glycidyl polyether had a softening point of 100° C. (Durrans' Mercury Method) and a weight per epoxide of 960.

Part B 21.11 grams of the glycidyl polyether of Part A of this example and 2.49 grams of dodecyl phenol were combined and heated with stirring at about 140° C. until a clear melt was obtained. The mixture was then cooled to about 130° C. and 1.4 grams of maleic anhydride were added, the mol ratio being one mol glycidyl polyether to 1.2 mols maleic acid anhydride to 0.8 mol monohydric phenol. To this homogeneous melt 0.5 percent, based on the total combined weights of the reactants, of dimethylaminomethyl phenol was added as a catalyst. A portion of about 25 grams of the catalyzed melt was poured into an aluminum cup. In a closed container whereby no anhydride would be lost through volatilization, the 25 gram portion of the melt was heated at a temperature of 125° C. for about three hours, followed by one hour at 180° C. A flexible, well cured resin was thus produced.

EXAMPLE 6

As in above Example 5, 19.91 grams of the glycidyl polyether of Part A of Example 5 and 3.10 grams of dinonyl phenol were combined and heated at about 140° C. with stirring until a homogeneous mixture was obtained. The mixture was cooled to 130° C. and 1.99 grams of phthalic acid anhydride were added, the mol ratio being one mol glycidyl polyether to 1.2 mols phthalic acid anhydride to 0.8 mol monohydric phenol. When the system was homogeneous, 0.5 percent of dimethylaminomethyl phenol was added as a catalyst, based on the total combined weights of the reactants. In order to cure the resinous melt, about 25 grams of the homogeneous mixture were transferred to a shallow aluminum cup. The cup was heated at a temperature of 180° C. for one hour in a closed container. A tough, cured resin of good strength was obtained.

EXAMPLE 7

Following Example 6, 20.85 grams of the glycidyl polyether of Part A of Example 5, 2.64 grams of "Nadic" acid anhydride and 1.51 grams of octyl phenol were reacted, the mol ratio being one mol glycidyl polyether to 1.375 mols "Nadic" acid anhydride to 0.625 mol monohydric phenol. When the system was homogeneous, 0.5 percent of dimethylaminomethyl phenol was added as a catalyst, based on the total combined weights of the reactants. In order to cure the resinous melt, about 25 grams of the homogeneous mixture were transferred to a shallow aluminum cup. The cup was heated at a temperature of 180° C. for one hour in a closed container. A tough, cured resin of good strength was obtained.

EXAMPLE 8

As in above Example 6, 22.36 grams of the glycidyl polyether of Part A of Example 5, 2.34 grams of maleic acid anhydride and 0.30 gram of diamyl phenol were reacted, the mol ratio being one mol glycidyl polyether to 1.9 mols maleic acid anhydride to 0.1 mol monohydric phenol. When the system was homogeneous, 0.5 percent of dimethylaminomethyl phenol was added as a catalyst, based on the total combined weights of the reactants. In order to cure the resinous melt, about 25 grams of the homogeneous mixture were transferred to a shallow aluminum cup. The cup was heated at a temperature of 125° C. for three hours, followed by one hour at 180° C. A hard, tough, cured resin of good strength was obtained.

EXAMPLE 9

Part A

About 536 parts (2.35 mols) of bisphenol and 211 parts (5.17 mols) of sodium hydroxide (10 percent excess) were combined in 1900 parts of water and heated to about 23° C. whereupon 436 parts (4.70 mols) of epichlorhydrin were added rapidly. The temperature was increased and remained at about 90° C. to 100° C. for an hour and 40 minutes. The mixture was separated into a two phase system and the aqueous layer drawn off. The resinous layer that remained was washed with hot water and then drained and dried at a temperature of about 140° C. The Durrans' Mercury Method melting point of the resulting product was 50° C. and the weight per epoxide was about 325.

Part B 17.42 grams of the glycidyl polyether of Part A of this example, 3.16 grams of maleic acid anhydride and 4.42 grams of octyl phenol were combined and heated with stirring until a clear melt was obtained, the mol ratio being 1.0 mol glycidyl polyether to 1.2 mols maleic acid anhydride to 0.8 mol monohydric phenol. To this homogeneous melt 0.5 percent, based on the total combined weights of the reactants, of benzyldimethylamine was added as a catalyst. A portion of about 25 grams of the catalyzed melt was poured into an aluminum cup. In a closed container whereby no anhydride would be lost through volatilization, the 25 gram portion of the melt was heated at a temperature of 125° C. for about three hours, followed by one hour at 180° C. A very flexible, well cured resin was obtained.

Using the glycidyl polyether of Example 9, Part A, and other proportions and reactants additional resins were prepared as in Example 1. Proportions, reactants and properties of resulting resins are set forth in the following table.

TABLE I

| Chemical Composition | Mol Ratio | Weight Per Cent | Grams in Mixture | Properties of Product |
|---|---|---|---|---|
| Glycidyl Polyether<br>Di-t-butyl-p-cresol<br>"Nadic" anhydride | 1.0<br>0.8<br>1.2 | 63.53<br>17.23<br>19.24 | 15.88<br>4.31<br>4.81 | Toughness, Good.<br>Flexibility, Good.<br>Impact resistance, Excellent.<br>Well cured, soft resin of fair strength. |
| Glycidyl Polyether<br>Phenol<br>Phthalic anhydride | 1.0<br>0.1<br>1.9 | 69.09<br>1.00<br>29.91 | 17.27<br>0.25<br>7.48 | Toughness, Excellent.<br>Flexibility, Excellent.<br>Impact resistance, Excellent.<br>Well cured, resin of good strength. |
| Glycidyl polyether<br>Phenol<br>Phthalic anhydride | 1.0<br>0.625<br>1.375 | 71.24<br>6.44<br>22.32 | 17.81<br>1.61<br>5.58 | Toughness, Good.<br>Flexibility, Excellent.<br>Impact resistance, Excellent.<br>Well cured resin of good strength. |
| Glycidyl polyether<br>o-Cresol<br>Phthalic anhydride | 1.0<br>0.275<br>1.725 | 69.50<br>3.18<br>27.32 | 17.37<br>0.80<br>6.83 | Toughness, Excellent.<br>Flexibility, Excellent.<br>Impact resistance, Excellent.<br>Well cured, hard resin of good strength. |

EXAMPLE 10

Part A

About one mol of bisphenol was dissolved in ten mols of epichlorhydrin and one to two percent water added to the resulting mixture. The mixture was then brought to 80° C. and two mols of sodium hydroxide added in small portions over a period of about one hour. During the addition, the temperature of the mixture was held at about 90° C. to 110° C. After the sodium hydroxide had been added, the water formed in the reaction and most of the epichlorhydrin was distilled off. The residue was combined with an approximately equal amount of benzene and the mixture filtered to remove the salt. The benzene was then removed to yield a viscous liquid having a weight per epoxide of 185.

Part B 13.49 grams of the glycidyl polyether of Part A of this example, 10.25 grams of phthalic acid anhydride, and 1.26 grams of dinonyl phenol were combined and heated with stirring until a clear melt was obtained, the mol ratio being one mol glycidyl polyether to 1.9 mols phthalic acid anhydride to 0.1 mol monohydric phenol. To this homogeneous melt, 0.5 percent, based on the total combined weights of the reactants, of dimethylaminomethyl phenol was added as a catalyst. A portion of about 25 grams of the catalyzed melt was poured into an aluminum cup. In a closed container whereby no anhydride would be lost through volatilization, the 25 gram portion of the melt was heated at a temperature of 180° C. for about one hour. A well cured, hard resin of good flexibility was obtained.

According to Example 10 other resins were prepared using the glycidyl polyether of said Example 10, the reactants as well as the properties of the resinous product are shown in Table II.

TABLE II

| Chemical Composition | Mol Ratio | Weight Per Cent | Grams in Mixture | Properties of Product |
|---|---|---|---|---|
| Glycidyl polyether<br>Dinonyl phenol<br>Phthalic anhydride | 1.0<br>0.275<br>1.725 | 51.34<br>13.23<br>35.43 | 12.84<br>3.31<br>8.85 | Toughness, Excellent.<br>Flexibility, Good.<br>Impact resistance, Excellent.<br>Well cured resin of good strength. |
| Glycidyl polyether<br>Dinonyl phenol<br>Phthalic anhydride | 1.0<br>0.45<br>1.55 | 48.98<br>20.65<br>30.37 | 12.25<br>5.16<br>7.59 | Toughness, Good.<br>Flexibility, Excellent.<br>Impact resistance, Excellent.<br>Well cured resin of good strength. |
| Glycidyl polyether<br>Dinonyl phenol<br>Phthalic anhydride | 1.0<br>0.8<br>1.2 | 44.86<br>33.61<br>21.53 | 11.22<br>8.40<br>5.38 | Toughness, Fair.<br>Flexibility, Good.<br>Impact resistance, Fair.<br>Well cured, soft resin of fair strength. |
| Glycidyl polyether<br>o-Cresol<br>Phthalic anhydride | 1.0<br>0.1<br>1.9 | 55.87<br>1.63<br>42.49 | 13.97<br>0.41<br>10.62 | Toughness, Excellent.<br>Flexibility, Good.<br>Impact resistance, Excellent.<br>Well cured, hard resin of good strength. |
| Glycidyl polyether<br>o-Cresol<br>Phthalic anhydride | 1.0<br>0.45<br>1.55 | 57.05<br>7.54<br>35.41 | 14.26<br>1.88<br>8.86 | Toughness, Excellent.<br>Flexibility, Excellent.<br>Impact resistance, Excellent.<br>Well cured resin of good strength. |
| Glycidyl polyether<br>o-Cresol<br>Phthalic anhydride | 1.0<br>0.8<br>1.2 | 58.34<br>13.64<br>28.02 | 14.58<br>3.41<br>7.01 | Toughness, Excellent.<br>Flexibility, Excellent.<br>Impact resistance, Excellent.<br>Well cured, soft resin of fair strength. |
| Glycidyl polyether<br>p-t-Bu-phenol<br>Phthalic anhydride | 1.0<br>0.1<br>1.9 | 55.52<br>2.25<br>42.23 | 13.88<br>0.56<br>10.56 | Toughness, Good.<br>Flexibility, Fair.<br>Impact resistance, Fair.<br>Well cured resin of good strength. |
| Glycidyl polyether<br>p-t-Bu-phenol<br>Phthalic anhydride | 1.0<br>0.45<br>1.55 | 55.46<br>10.13<br>34.41 | 13.87<br>2.53<br>8.60 | Toughness, Good.<br>Flexibility, Good.<br>Impact resistance, Good.<br>Well cured resin of good strength. |
| Glycidyl polyether<br>p-t-Bu-phenol<br>Phthalic anhydride | 1.0<br>0.8<br>1.2 | 55.40<br>18.00<br>26.60 | 13.85<br>4.50<br>6.65 | Toughness, Good.<br>Flexibility, Good.<br>Impact resistance, Good.<br>Well cured resin of good strength. |
| Glycidyl polyether<br>Octylphenol<br>Phthalic anhydride | 1.0<br>0.8<br>1.2 | 51.92<br>23.15<br>24.93 | 12.98<br>5.79<br>6.23 | Toughness, Good.<br>Flexibility, Good.<br>Impact resistance, Good.<br>Well cured resin of fair strength. |
| Glycidyl polyether<br>Diamylphenol<br>Phthalic anhydride | 1.0<br>0.1<br>1.9 | 54.82<br>3.48<br>41.70 | 13.71<br>0.87<br>10.42 | Toughness, Excellent.<br>Flexibility, Good.<br>Impact resistance, Excellent.<br>Well cured, hard resin of good strength. |
| Glycidyl polyether<br>Diamylphenol<br>Phthalic anhydride | 1.0<br>0.45<br>1.55 | 52.45<br>15.01<br>32.54 | 13.11<br>3.75<br>8.14 | Toughness, Good.<br>Flexibility, Good.<br>Impact resistance, Fair.<br>Well cured resin of good strength. |
| Glycidyl polyether<br>Diamylphenol<br>Phthalic anhydride | 1.0<br>0.8<br>1.2 | 50.27<br>25.58<br>24.15 | 12.57<br>6.40<br>6.03 | Toughness, Good.<br>Flexibility, Good.<br>Impact resistance, Fair.<br>Well cured resin of fair strength. |
| Glycidyl polyether<br>Dodecylphenol<br>Phthalic anhydride | 1.0<br>0.1<br>1.9 | 54.60<br>3.87<br>41.53 | 13.65<br>0.97<br>10.38 | Toughness, Good.<br>Flexibility, Good.<br>Impact resistance, Fair.<br>Well cured, hard resin of good strength. |
| Glycidyl polyether<br>Dodecylphenol<br>Phthalic anhydride | 1.0<br>0.45<br>1.55 | 51.55<br>16.46<br>31.99 | 12.89<br>4.11<br>8.00 | Toughness, Good.<br>Flexibility, Excellent.<br>Impact resistance, Fair.<br>Well cured resin of good strength. |
| Glycidyl polyether<br>Dodecylphenol<br>Phthalic anhydride | 1.0<br>0.8<br>1.2 | 48.84<br>27.71<br>23.45 | 12.21<br>6.93<br>5.86 | Toughness, Fair.<br>Flexibility, Good.<br>Impact resistance, Good.<br>Well cured resin of fair strength. |
| Glycidyl polyether<br>1-Naphthol<br>Phthalic anhydride | 1.0<br>0.625<br>1.375 | 55.74<br>13.63<br>30.63 | 13.94<br>3.41<br>7.65 | Toughness, Excellent.<br>Flexibility, Good.<br>Impact resistance, Good.<br>Well cured resin of good strength. |

The above examples illustrate that excellent, well cured resins can be obtained by the modification of a glycidyl polyether in admixture with phthalic anhydride by the addition of not more than about 0.80 mol of a monohydric phenol for two epoxide equivalents. The examples also show that even more desirable resins are obtained using lower quantities of the monohydric phenol. The resins of this invention, modified by the use of a monohydric phenol, have better flexibility than the same glycidyl polyether cured with phthalic anhydride alone. There are also differences in stress-strain properties, impact strength, heat distortion and the like.

In addition to advantages in properties, the incorporation of a monohydric phenol into anhydride cured epoxide resins has a distinct economic advantage over the unmodified resins since monohydric phenols are less expensive than glycidyl polyethers which they replace, yet the resulting resin has improved properties when compared with the unmodified resin. Hence, the final product is not only considerably less expensive but is better.

The new resins which are products of the process of this invention are particularly advantageous for use in the fields of adhesives, molding, paints, varnishes, potting and the like, principally for heat hardening plastics, heat hardening varnishes, enamels, and other coatings, electrical insulation and castings.

Other uses and embodiments of the invention will occur to those skilled in the art. For example, the resins of this invention can have certain additional materials incorporated with them to alter or improve some property or to make them more easily molded. Among the materials which can be added are fillers such as finely divided wood flour, cotton flock, and asbestos; coloring materials such as pigments; thinners which will enable the formation of thin coatings for protection of such materials as metal; plasticizers to aid in adapting the resins to different uses or to impart to them somewhat different properties; and small amounts of other materials which may hasten curing. Such embodiments may be made without departing from the spirit and scope of this invention.

What is claimed is:

1. A process for preparing a resin which comprises heating and reacting a glycidyl polyether of a polyhydric compound selected from the group consisting of polyhydric phenols and polyhydric alcohols, said polyether containing more than one epoxide group per molecule and having a weight per epoxide below 1000, a polycarboxylic acid anhydride and a monohydric phenol in a ratio of two epoxide equivalents of glycidyl polyether to from 0.1 to 0.8 mol of monohydric phenol to from 1.9 to 1.2 equivalents of polycarboxylic acid anhydride, considering an epoxide equivalent as the weight in grams of glycidyl polyether per epoxide group, and an anhydride equivalent as the weight of acid anhydride in grams per anhydride group.

2. The process of claim 1 wherein the glycidyl polyether, monohydric phenol and polybasic acid anhydride are reacted in the presence of a catalyst selected from the group consisting of inorganic bases, tertiary amines and quaternary ammonium hydroxides.

3. The process of claim 1 wherein the monohydric phenolic compound is an alkyl phenol, wherein the glycidyl polyether has a weight per epoxide below 240 and wherein the polycarboxylic acid anhydride is a dicarboxylic acid anhydride.

4. The process of claim 3 wherein the monohydric phenolic compound is an alkyl phenol, wherein the glycidyl polyether comprises substantially the diglycidyl ether of a dihydric phenol having a weight per epoxide of 140 to 200 and wherein the polycarboxylic acid is phthalic acid anhydride.

5. A cross-linked infusible resinous reaction product resulting from the process of claim 1.

6. A cross-linked infusible resinous reaction product resulting from the process of claim 3.

7. A cross-linked infusible resinous reaction product resulting from the process of claim 4.

8. A process for preparing a resinous composition which comprises condensing a polycarboxylic acid anhydride and a glycidyl polyether of a polyhydric compound selected from the group consisting of polyhydric phenols and polyhydric alcohols, said polyether containing more than one epoxide group per molecule and having a weight per epoxide below 1000, with the product resulting from the reaction of one mol of a monohydric phenol with two epoxide equivalents of glycidyl polyether of a polyhydric compound selected from the group consisting of polyhydric phenols and polyhydric alcohols and also containing more than one epoxide group per molecule and having a weight per epoxide below 1000, the reactants being present in the resinous composition in a ratio of two epoxide equivalents of glycidyl polyether to from 0.1 to 0.8 mol monohydric phenol to from 1.9 to 1.2 equivalents of polycarboxylic acid anhydride, considering an epoxide equivalent as the weight in grams of glycidyl polyether per epoxide group, and an anhydride equivalent as the weight of acid anhydride in grams per anhydride group.

9. A composition containing as its essential constituents a glycidyl polyether of a polyhydric compound selected from the group consisting of polyhydric phenols and polyhydric alcohols, said polyether containing more than one epoxide group per molecule and having a weight per epoxide below 1000, a monohydric phenol and a polycarboxylic acid anhydride in a ratio of two epoxide equivalents of glycidyl polyether to from 0.1 to 0.8 mol of monohydric phenol to from 1.9 to 1.2 equivalents of polycarboxylic acid anhydride, considering an epoxide equivalent as the weight in grams of glycidyl polyether per epoxide group, and an anhydride equivalent as the weight of acid anhydride in grams per anhydride group.

References Cited in the file of this patent

UNITED STATES PATENTS

| | | |
|---|---|---|
| 2,324,483 | Castan | July 20, 1943 |
| 2,512,997 | Bixler | June 27, 1950 |
| 2,615,008 | Greenlee | Oct. 21, 1952 |
| 2,651,589 | Shokal et al. | Sept. 8, 1953 |
| 2,700,030 | Widmer | Jan. 18, 1955 |
| 2,731,444 | Greenlee | Jan. 17, 1956 |

FOREIGN PATENTS

| | | |
|---|---|---|
| 630,647 | Great Britain | Oct. 18, 1949 |

OTHER REFERENCES

Ind. and Eng. Chem., vol 48, No. 1, pp. 86–93 (January 1956).

UNITED STATES PATENT OFFICE
CERTIFICATE OF CORRECTION

Patent No. 2,908,664                                 October 13, 1959

William J. Belanger et al.

It is hereby certified that error appears in the printed specification of the above numbered patent requiring correction and that the said Letters Patent should read as corrected below.

Column 2, line 63, for "plotting" read -- potting --; column 3, line 15, for "monhydric" read -- monohydric --; column 4, line 8, for "glycidly" read -- glycidyl --; column 5, line 69, for "822 parts" read -- 832 parts --.

Signed and sealed this 5th day of April 1960.

(SEAL)
Attest:

KARL H. AXLINE                                             ROBERT C. WATSON
Attesting Officer                                          Commissioner of Patents